United States Patent [19]

Dijkmans et al.

[11] 4,366,346

[45] Dec. 28, 1982

[54] ARTIFICIAL REVERBERATION APPARATUS

[75] Inventors: Eise C. Dijkmans, Eindhoven, Netherlands; Nico V. Franssen, deceased, late of Knegsel, Netherlands; by Friedrich J. De Haan, administrator, Dommelen, Netherlands

[73] Assignee: U.S. Philips Corporation, New York, N.Y.

[21] Appl. No.: 140,288

[22] Filed: Apr. 14, 1980

[30] Foreign Application Priority Data

Apr. 24, 1979 [NL] Netherlands ........................ 7903195

[51] Int. Cl.³ ............................................ G01K 11/00

[52] U.S. Cl. ..................................................... 179/1 J

[58] Field of Search .................... 179/1 J, 1 GQ, 1 G, 179/1 GP; 84/1.25, DIG. 26

[56] References Cited

U.S. PATENT DOCUMENTS 3,939,437 2/1976 Adam ................................ 179/1 JX

*Primary Examiner*—Joseph A. Popek

*Attorney, Agent, or Firm*—Robert T. Mayer; Bernard Franzblau

[57] ABSTRACT

Artificial reverberation apparatus comprising a delay device (1) provided with a feedback circuit (5) and a feed-forward circuit (6) having a gain equal and opposite to that of the feedback circuit if the gain in the delay device is unity. In order to simulate a second echo having a different delay time using a minimum number of circuit components, the foregoing reverberation circuit is included in cascade with a second delay device (11) and the resulting combination is provided with its own feedback circuit (15) and feed-forward circuit (16). In order to simulate a third echo having yet another delay time, the resulting circuit may be included in cascade with a third delay device (21) with the resulting combination having its own feedback circuit (25 ) and feed forward circuit (26).

14 Claims, 2 Drawing Figures

ARTIFICIAL REVERBERATION APPARATUS

BACKGROUND OF THE INVENTION

The invention relates to artificial reverberation apparatus comprising a first signal combining circuit having a first input coupled to an input terminal, a second signal combining circuit having a first input coupled to the output of the first signal combining circuit via a delay device, a feedback circuit coupling a first point on the signal path between the output of the delay device and the first input of the second signal combining circuit to a second input of the first signal combining circuit, and a transmission circuit coupling a second point on the signal path between the output of the first signal combining circuit and the input of the delay device to a second input of the second signal combining circuit in such manner as to circumvent said delay device. The gain of said transmission circuit is chosen so that the ratio of the gain in the signal path from said second point to the output of the second signal combining circuit via said transmission circuit to the gain in the signal path from said second point to the output of the second signal combining circuit via said delay device is substantially equal and opposite to the gain around the circuit loop including the delay device and the feedback circuit, which gain is less than unity.

An apparatus of the above type is the subject of an article in the Proceedings of the IEEE, August 1977, pages 1108 to 1137, see especially page 1127, FIG. 27. Use of this known apparatus gives a listener the impression that a sound signal derived from its output is accompanied by an echo signal which is delayed with respect to the primary signal by a time corresponding to the delay produced by the delay device. Multiple echoes are often required, i.e. echo signals which correspond to different delays and in such a case a plurality of such apparatuses could be connected in cascade, but this demands the use of a plurality of delay devices each producing the relevant delay. If these delay devices take the form of charge transfer devices, for example bucket brigade or charge coupled devices, a considerable number of storage locations will be required.

SUMMARY OF THE INVENTION

It is an object of the invention to effect an economy in this respect.

The invention provides an artificial reverberation apparatus comprising a first signal combining circuit having a first input coupled to an input terminal and a second signal combining circuit having a first input coupled to the output of the first signal combining circuit via a delay device. A feedback circuit couples a first point on the signal path between the output of the delay device and the first input of the second signal combining circuit to a second input of the first signal combining circuit. A transmission circuit couples a second point on the signal path between the output of the first signal combining circuit and the input of the delay device to a second input of the second signal combining circuit so as to bypass said delay device. The gain of said transmission circuit is such that the ratio of the gain in the signal path from said second point to the output of the second signal combining circuit via said transmission circuit to the gain in the signal path from said second point to the output of the second signal combining circuit via said delay device is substantially equal and opposite to the gain around the circuit loop including the delay device and the feedback circuit, which gain is less than unity. The invention is characterised in that a third signal combining circuit is included in the coupling from the input terminal to the first input of the first signal combining circuit in such manner that the input terminal is coupled to a first input of said third signal combining circuit and the output of said third signal combining circuit is coupled to the first input of the first signal combining circuit, and that the output of the second signal combining circuit is coupled to a first input of a fourth signal combining circuit. A further (second) feedback circuit couples a third point on the signal path between the output of the second signal combining circuit and the first input of the fourth signal combining circuit to a second input of the third signal combining circuit. A further (second) transmission circuit couples a fourth point on the signal path between the output of the third signal combining circuit and the first input of the first signal combining circuit to a second input of the fourth signal combining circuit in a manner so as to bypass said delay device and said first and second signal combining circuits. A further (second) delay device may be included in the signal path from said fourth point to the first input of the first signal combining circuit and/or in the signal path from the output of the second signal combining circuit to said third point. The gain of said further transmission circuit is such that the ratio of the gain in the signal path between said fourth point and the output of the fourth signal combining circuit via said further transmission circuit to the gain in the signal path between said fourth point and the output of the fourth signal combining circuit via the first-mentioned delay device and the or each said further delay device is substantially equal and opposite to the gain around the circuit loop including the first-mentioned delay device, the or each said further delay device, and said further feedback circuit, which gain is less than unity.

In this respect, it is to be noted that the inclusion of further delay lines has already been proposed in U.S. Pat. No. 3,939,436, but the object thereof as well as the further embodiment are entirely different from those in accordance with the present invention.

BRIEF DESCRIPTION OF THE DRAWINGS

An embodiment of the invention will be described, by way of example, with reference to the accompanying diagrammatic drawing, in which.

DETAILED DESCRIPTION OF THE DRAWINGS

Figure 1:
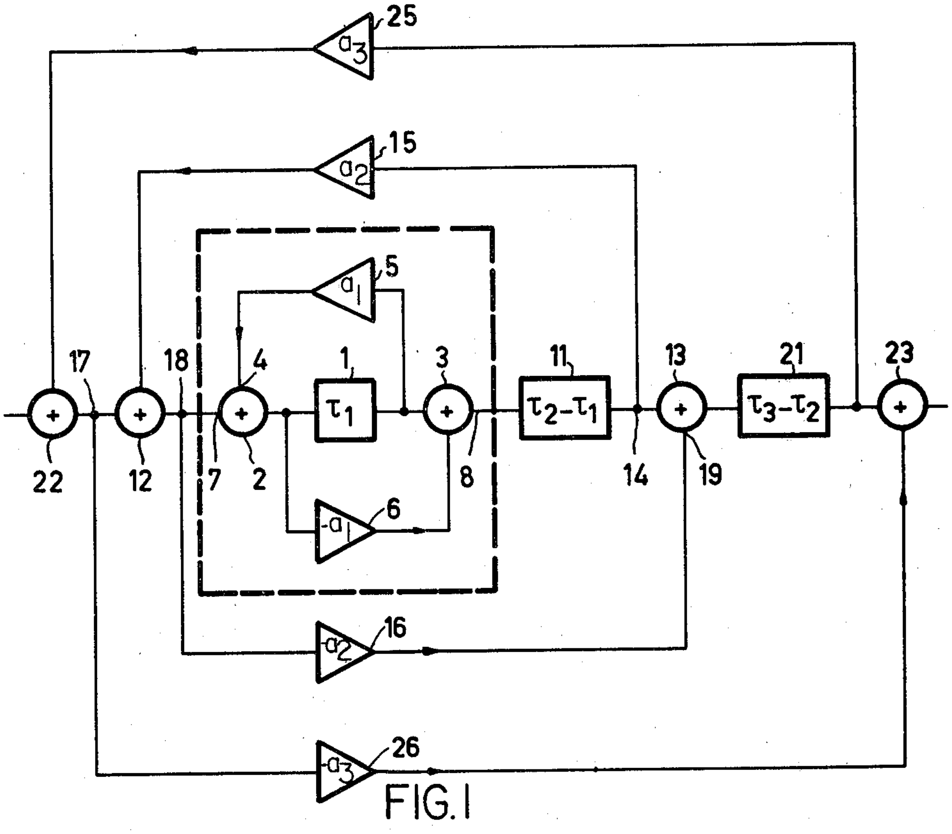
FIG. 1 shows a first embodiment and FIG. 2 shows a second embodiment of the artificial reverberation apparatus according to the invention.

In FIG. 1 the artificial reverberation apparatus for audio signals comprises a first delay device 1, which is preceded by a first signal combining or adding circuit 2 and is followed by a second signal combining or adding circuit 3. A first feedback circuit 5 connects the output of the delay device 1, which is connected to a first input of combining circuit 3, to an input 4 of the combining circuit 2. Feedback circuit 5 is arranged to give a feedback factor (product of the gains in device 1 and in feedback circuit 5) smaller than 1, for example 0.7, and the provision thereof gives rise to an artificial reverberation effect. In order to obtain a flat chaacteristic as a function of frequency for the signal at the output of the combining circuit 3, a first transmission circuit 6, e.g. a conventional operational amplifier, couples the output of the combining circuit 2 to a second input of the combining circuit 3. If the gain of delay device 1 is unity, the transmission factor of the feedback circuit 5 should be identical to that of the transmission circuit 6 but of opposite sign. If the gain in device 1 is different from unity, the transmission factors will have to be adapted accordingly.

The part of the circuit arrangement between the other input 7 of the combining circuit 2 and the output 8 of the combining circuit 3 behaves as an all-pass network, i.e. it has a constant amplitude transmission, but its phase characteristic is a function of frequency.

Figure 2:
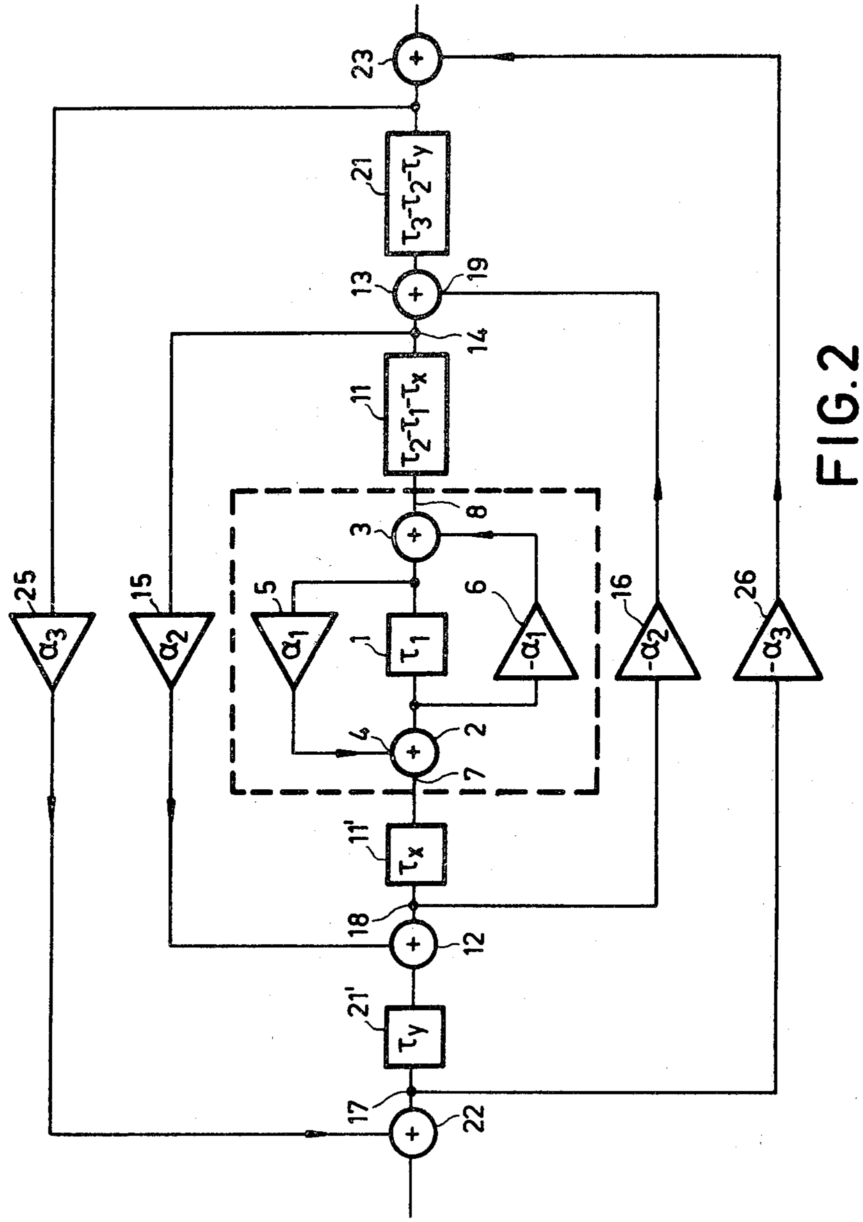

In order to produce the effect of an additional echo having a different delay, a further (second) delay device 11 and further combining circuits 12 and 13 are included in the apparatus, combining circuit 12 being included in the signal path to the input 7 of combining circuit 2 and combining circuit 13 being included in the signal path and from the output of combining circuit 3. The signal fed to the input 14 of the combining circuit 13 is also fed to a second input of the combining circuit 12 via a further (second) feedback circuit 15. The output 18 of combining circuit 12 is also connected to the second input 19 of the combining circuit 13 via a further (second) transmission circuit 16 (e.g. a conventional op-amp) having a transmission factor which is equal and opposite to that of the circuit 15 (assuming that the gain in delay device 11 is also unity). The delay to which the additional echo thus introduced corresponds is equal to the sum of those produced by the delay devices 1 and 11 ($\tau_1$ and $\tau_2-\tau_1$ respectively). The same effect is obtained if the delay device 11 is transferred to a point in the circuit between the point 18 and the input 7 of the combining circuit 2, or if part of it is included in the one position and part of it in the other. This last embodiment is shown in FIG. 2 where a delay device 11' is connected between the point 18 and the input 7 of the combining circuit 2, and the delay device 11 is again connected between the points 8 and 14. If the delay time of delay device 11' is $\tau_x$, then delay device 11 should have a delay time of $\tau_2-\tau_1-\tau_x$ in order to obtain a circuit indentical in behaviour to the circuit of FIG. 1.

In a similar manner the apparatus of FIG. 1 so far described may be provided with a further fifth combining circuit 22 in the signal path to the first input 17 of the third combining circuit 12 and a further (sixth) combining circuit 23 included in the signal path from the output of the fourth combining circuit 13. The input of the combining circuit 23, which is fed from the output of combining circuit 13, also is connected to a second input of the combining circuit 22 via an auxiliary (third) feedback circuit 25. The output of the combining circuit 22 also is connected to a second input of the combining circuit 23 via an auxiliary (third) transmission circuit 26 (e.g. a conventional op-amp) having a transmission factor which is equal and opposite to that of auxiliary feedback circuit 25 to ensure that the overall transmission characteristic as a function of frequency is flat. An auxiliary (third) delay device 21 is provided for introducing an echo corresponding to a delay equal to the sum of the delays produced by the devices 1, 11 and 21 ($\tau_1$, $T_2-\tau_1$ and $T_3-\not\equiv_2$ respectively). The delay device 21 is included in the signal path from the combining circuit 13 to the combining circuit 23, or alternatively in the signal path from the point 17 to the combining circuit 12, or part of it in the one position and part of it in the other. FIG. 2 also shows the latter embodiment where a delay device 21' is connected between point 17 and an input combining circuit 12, and the delay device 21 is again connected between the combining circuits 13 and 23. The respective delay times of the delay devices are shown in the drawing. The choice of the transmission factor of circuit 26 to be equal and opposite to that of feedback circuit 25 is made on the assumption that the gain of delay device 21 is unity.

As mentioned above, the choice of the transmission factors $-\alpha_1, -\alpha_2$ and $-\alpha_3$ of the transmission circuits 6, 16 and 26 respectively to be equal and opposite to the transmission factors $\alpha_1$, $\alpha_2$ and $\alpha_3$ respectively of the feedback circuits 5, 15, and 25 respectively is made on the assumption that the gains of the delay devices 1, 11 and 21 and the signal combining circuits 2, 3, 12, 13, 22 and 23 are all equal to unity. However, this is not necessarily the case. One or more of these gains may be greater than or less than unity. In general, if the gains from the commoned inputs of delay device 1 and transmission circuit 6 to the output 8 of combining circuit 3 via transmission circuit 6 and delay device 1 are $\beta_1$ and A respectively, then $-\beta_1/A$ should be equal to the gain around the loop including delay device 1, feedback circuit 5 and combining circuit 2, i.e. should be equal to the feedback factor or loop gain thereof. Similarly, if the gains from point 18 to the output of combining circuit 13 via transmission circuit 16 and via delay devices 1 and 11 respectively are $\beta_2$ and B respectively, then $-\beta_2/B$ should be equal to the gain around the loop including delay devices 1 and 11, feedback circuit 15 and combining circuit 12, i.e. should be equal to the feedback factor or loop gain thereof. Similarly, if the gains from point 17 to the output of combining circuit 23 via the transmission circuit 26 and via the delay devices 1, 11 and 21 are $\beta_3$ and C, respectively, then $-\beta_3/C$ should be equal to the gain around the loop including delay devices 1, 11 and 21, feedback circuit 25 and combining circuit 22, i.e. should be equal to the feedback factor or loop gain thereof.

What is claimed is:

1. Artificial reverberation apparatus comprising, a first signal combining circuit having a first input and an output, an input terminal, a second signal combining circuit having a first input coupled to the output of the first signal combining circuit via a delay device, a feedback circuit coupling a first point on a signal path between an output of the delay device and the first input of the second signal combining circuit to a second input of the first signal combining circuit, a transmission circuit coupling a second point on a signal path between the output of the first signal combining circuit and an input of the delay device to a second input of the second signal combining circuit so as to bypass said delay device, the gain of said transmission circuit being chosen so that the ratio of the gain in the signal path from said second point to the output of the second signal combining circuit via said transmission circuit to the gain in the signal path from said second point to the output of the second signal combining circuit via said delay device is substantially equal and opposite to the gain around the circuit loop including the delay device and the feedback circuit, which gain is less than unity, a third signal combining circuit having a first input and an output, first means coupling the third signal combining circuit from the input terminal to the first input of the first signal combining circuit via the first input and the output of said third signal combining circuit, means coupling the output of the second signal combining circuit to a first input of a fourth signal combining circuit, means coupling a further feedback circuit between a third point on a signal path between the output of the second signal combining circuit and the first input of the fourth signal combining circuit and a second input of the third signal combining circuit, a further transmission circuit coupling a fourth point on the signal path between the output of the third signal combining circuit and the first input of the first signal combining circuit to a second input of the fourth signal combining circuit so as to bypass said delay device and said first and second signal combining circuits, and a further delay device included in cascade in a signal path from said fourth point to said third point, the gain of said further transmission circuit being chosen so that the ratio of the gain in the signal path between said fourth point and the output of the fourth signal combining circuit via said further transmission circuit to the gain in the signal path between said fourth point and the output of the fourth signal combining circuit via said delay device and the said further delay device is substantially equal and opposite to the gain around the circuit loop including said delay device, the said further delay device, and said further feedback circuit, which gain is less than unity.

2. Apparatus as claimed in claim 1 wherein said first coupling means includes a fifth signal combining circuit coupling the input terminal to the first input of the third signal combining circuit and with the input terminal coupled to a first input of said fifth signal combining circuit and an output of said fifth signal combining circuit coupled to the first input of the third signal combining circuit, means coupling the output of the fourth signal combining circuit to a first input of a sixth signal combining circuit, an auxiliary feedback circuit coupling a fifth point on a signal path between the output of the fourth signal combining circuit and the first input of the sixth signal combining circuit to a second input of the fifth signal combining circuit, an auxiliary transmission circuit coupling a sixth point on the signal path between the output of the fifth signal combining circuit and the first input of the third signal combining circuit to a second input of the sixth signal combining circuit so as to bypass said delay device, the said further delay device, and the first, second, third and fourth signal combining circuits, and an auxiliary delay device included in cascade in a signal path from said sixth point to said fifth point, the gain of said auxiliary transmission circuit being chosen so that the ratio of the gain in the signal path between said sixth point and the output of the sixth signal combining circuit via said auxiliary transmission circuit to the gain in the signal path between said sixth point and the output of the sixth signal combining circuit via said delay device, the said further delay device, and the said auxiliary delay device is substantially equal and opposite to the gain around the circuit loop including said delay device, the said further delay device, the said auxiliary delay device, and said auxiliary feedback circuit, which gain is less than unity.

3. An artificial reverberation apparatus comprising, an input terminal, first, second, third and fourth signal combining circuits each having input means and an output, a first delay device, means coupling the third signal combining circuit, the first signal combining circuit, the first delay device, the second signal combining circuit and the fourth signal combining circuit in cascade in the order named to the input terminal to form a signal path having a first junction point between the first delay device and the second signal combining circuit, a second junction point between the first signal combining circuit and the first delay device, a third junction point between the second and the fourth signal combining circuits and a fourth junction point between the third and the first signal combining circuits, a second delay device coupled in cascade with the third and fourth signal combining circuits in said signal path, first and second feedback circuits coupled between said first and third points, respectively, and the input means for said first and third signal combining circuits, respectively, first and second transmission circuits coupled between said second and fourth points, respectively, and the input means of the second and fourth signal combining circuits, respectively, so that the first transmission circuit bypasses the first delay device and the second transmission circuit bypasses the first delay device and the first and second signal combining circuits, and wherein the gain of the first transmission circuit is chosen so that the ratio of the gains of first and second signal paths from said second point to the output of the second signal combining circuit via the first transmission circuit and via the first delay device, respectively, is substantially equal and opposite to the gain of a circuit loop including the first delay device and the first feedback circuit, said gain being less than one, and the gain of the second transmission circuit is chosen so that the ratio of the gains of third and fourth signal paths from said fourth point to the output of the fourth signal combining circuit via the second transmission circuit and via said first and second delay devices, respectively, is substantially equal and opposite to the gain of a circuit loop including said first and second delay devices and the second feedback circuit, said gain being less than one.

4. An apparatus as claimed in claim 3 further comprising fifth and sixth signal combining circuits each having input means and an output and connected in said signal path in cascade with the first, second, third and fourth signal combining circuits and the first and second delay devices and with the fifth signal combining circuit coupled between the input terminal and the input means of the third signal combining circuit and the sixth signal combining circuit coupled to the output of the fourth signal combining circuit, said signal path including fifth and sixth junction points located respectively between the fourth and sixth signal combining circuits and between the fifth and third signal combining circuits, a third feedback circuit coupling said fifth point to the input means of the fifth signal combining circuit, a third transmission circuit coupling said sixth point to the input means of the sixth signal combining circuit so as to bypass the first and second delay devices and the first, second, third and fourth signal combining circuits, and a third delay device coupled in cascade in the signal path and between the fifth and sixth junction points, and wherein the gain of the third transmission circuit is chosen so that the ratio of the gains of fifth and sixth signal paths between said sixth point and the output of the sixth signal combining circuit via the third transmission circuit and via said first, second and third delay devices, respectively, is substantially equal and opposite to the gain of a circuit loop including said first, second and third delay devices and the third feedback circuit, said gain being less than one.

5. An apparatus as claimed in claim 4 wherein said third delay device is coupled between the output of the fourth signal combining circuit and the input means of the sixth signal combining circuit.

6. An apparatus as claimed in claim 4 wherein said third delay device is coupled between the output of the fifth signal combining circuit and the input means of the third signal combining circuit.

7. An apparatus as claimed in claim 4 wherein said third delay device is sub-divided into fourth and fifth delay devices coupled between the output of the fourth signal combining circuit and the input means of the sixth signal combining circuit and between the output of the fifth signal combining circuit and the input means of the third signal combining circuit, respectively.

8. An apparatus as claimed in claim 4 wherein said second delay device is coupled between the output of the second signal combining circuit and the input means of the fourth signal combining circuit and said third delay device is coupled between the output of the fourth signal combining circuit and the input means of the sixth signal combining circuit.

9. An apparatus as claimed in claim 4 wherein said second delay device is coupled between the output of the third signal combining circuit and the input means of the first signal combining circuit and said third delay device is coupled between the output of the fifth signal combining circuit and the input means of the third signal combining circuit.

10. An apparatus as claimed in claim 4 wherein the first, second and third delay devices and the first, second, third, fourth, fifth and sixth signal combining circuits each have a unity gain factor so that the gain of the first transmission circuit is equal and opposite the gain of the first feedback circuit, the gain of the second transmission circuit is equal and opposite the gain of the second feedback circuit, and the gain of the third transmission circuit is equal and opposite the gain of the third feedback circuit.

11. An apparatus as claimed in claim 3 wherein said second delay device is coupled between the output of the second signal combining circuit and the input means of the fourth signal combining circuit.

12. An apparatus as claimed in claim 3 wherein said second delay device is coupled between the output of the third signal combining circuit and the input means of the first signal combining circuit.

13. An apparatus as claimed in claim 3 wherein said second delay device is sub-divided into third and fourth delay devices coupled between the output of the second signal combining circuit and the input means of the fourth signal combining circuit and between the output of the third signal combining circuit and the input means of the first signal combining circuit, respectively.

14. An apparatus as claimed in claim 3 wherein the first and second delay devices and the first, second, third and fourth signal combining circuits each have a unity gain factor so that the gain of the first transmission circuit is equal and opposite the gain of the first feedback circuit and the gain of the second transmission circuit is equal and opposite the gain of the second feedback circuit.

* * * * *